United States Patent
Prasanna (10) Patent No.: US 9,952,898 B2
(45) Date of Patent: Apr. 24, 2018

(54) DYNAMIC CONSTRUCTION AND MANAGEMENT OF TASK PIPELINES

(71) Applicant: Tact.ai Technologies, Inc., Redwood City, CA (US)

(72) Inventor: Dhananjay Prasanna, San Francisco, CA (US)

(73) Assignee: Tact.ai Technologies, Inc., Redwood City, CA (US)

( * ) Notice: Subject to any disclaimer, the term of this patent is extended or adjusted under 35 U.S.C. 154(b) by 209 days.

(21) Appl. No.: 14/209,900

(22) Filed: Mar. 13, 2014

(65) Prior Publication Data

US 2014/0282570 A1    Sep. 18, 2014

Related U.S. Application Data

(60) Provisional application No. 61/789,504, filed on Mar. 15, 2013.

(51) Int. Cl.
  *G06F 9/46* (2006.01)
  *G06F 9/48* (2006.01)

(52) U.S. Cl.
  CPC ...... *G06F 9/4881* (2013.01); *G06F 2209/484* (2013.01)

(58) Field of Classification Search
  CPC .................................................. G06F 9/4881
  USPC ....................................................... 718/102
  See application file for complete search history.

(56) References Cited

U.S. PATENT DOCUMENTS

| 6,275,766 B1* | 8/2001 | Zhang ................... F02D 41/009 |
| | | 701/102 |
| 6,725,211 B1* | 4/2004 | Ashton .................... G06F 8/456 |
| 8,005,697 B1* | 8/2011 | Cohen .................... G06Q 10/06 |
| | | 705/7.13 |
| 8,543,436 B2* | 9/2013 | Bhatnagar ............... G06F 9/542 |
| | | 705/7.11 |
| 8,887,163 B2* | 11/2014 | Rastogi ................. G06F 9/4881 |
| | | 718/102 |
| 2001/0005853 A1* | 6/2001 | Parkes ................. G06F 9/4843 |
| | | 718/106 |
| 2002/0078189 A1* | 6/2002 | McCombe ............ G06F 9/4881 |
| | | 709/223 |
| 2003/0135384 A1* | 7/2003 | Nguyen ............... G06Q 10/103 |
| | | 705/301 |
| 2005/0060711 A1* | 3/2005 | Ericsson ............... G06F 9/4843 |
| | | 718/107 |
| 2005/0283783 A1* | 12/2005 | DeSota ......................... 718/100 |
| 2006/0015700 A1* | 1/2006 | Burka ........................... 711/163 |

(Continued)

*Primary Examiner* — Mehran Kamran
(74) *Attorney, Agent, or Firm* — Fenwick & West LLP (57) ABSTRACT

A system and method are disclosed for managing the execution of tasks. Each task in a first set of tasks included in a pipeline is queued for parallel execution. The execution of the tasks is monitored by a dispatching engine. When a particular task that specifies a next set of tasks in the pipeline to be executed has completed, the dispatching engine determines whether the next set of tasks can be executed before the remaining tasks in the first set of tasks have completed. When the next set of tasks can be executed before the remaining tasks have completed, the next set of tasks is queued for parallel execution. When the next set of tasks cannot be executed before the remaining tasks have completed, the next set of tasks is queued for parallel execution only after the remaining tasks have completed.

19 Claims, 6 Drawing Sheets

(56) References Cited

U.S. PATENT DOCUMENTS

| | | | |
|---|---|---|---|
| 2006/0026212 A1* | 2/2006 | Tsukerman | G06F 17/30289 |
| 2007/0061783 A1* | 3/2007 | Prakash | G06F 9/505 |
| | | | 717/127 |
| 2007/0162899 A1* | 7/2007 | Schmidt | G06F 9/44 |
| | | | 717/136 |
| 2007/0214457 A1* | 9/2007 | Goyal | G06F 17/30171 |
| | | | 718/101 |
| 2007/0233287 A1* | 10/2007 | Sheshagiri | G06F 8/20 |
| | | | 700/83 |
| 2008/0066066 A1* | 3/2008 | MacPherson | G06F 9/5027 |
| | | | 718/100 |
| 2008/0235690 A1* | 9/2008 | Ang | G06F 9/526 |
| | | | 718/102 |
| 2009/0070162 A1* | 3/2009 | Leonelli | G06Q 10/0633 |
| | | | 705/7.27 |
| 2009/0077561 A1* | 3/2009 | Feng | G06F 9/5066 |
| | | | 718/104 |
| 2009/0144748 A1* | 6/2009 | Foody | G06F 9/5088 |
| | | | 718/107 |
| 2009/0320032 A1* | 12/2009 | Avni et al. | 718/103 |
| 2010/0083253 A1* | 4/2010 | Kushwaha | G06Q 10/063 |
| | | | 718/100 |
| 2010/0175075 A1* | 7/2010 | Acedo | G06F 9/547 |
| | | | 719/328 |
| 2010/0186020 A1* | 7/2010 | Maddhirala | G06F 9/5038 |
| | | | 718/105 |
| 2011/0004881 A1* | 1/2011 | Terechko et al. | 718/102 |
| 2011/0072434 A1* | 3/2011 | Avni | G06F 9/4881 |
| | | | 718/102 |
| 2011/0099552 A1* | 4/2011 | Avni et al. | 718/103 |
| 2011/0161637 A1* | 6/2011 | Sihn | G06F 9/5066 |
| | | | 712/220 |
| 2011/0258012 A1* | 10/2011 | Bhatnagar | G06F 9/542 |
| | | | 705/7.15 |
| 2011/0276966 A1* | 11/2011 | Christensen | G06F 9/5038 |
| | | | 718/100 |
| 2011/0302384 A1* | 12/2011 | Matsui | G06Q 10/10 |
| | | | 711/166 |
| 2011/0321051 A1* | 12/2011 | Rastogi | G06F 9/4881 |
| | | | 718/102 |
| 2012/0102246 A1* | 4/2012 | Nakata | 710/106 |
| 2012/0198457 A1* | 8/2012 | Leonelli | G06Q 10/06 |
| | | | 718/102 |
| 2012/0291045 A1* | 11/2012 | Martin | G06F 9/4843 |
| | | | 718/106 |
| 2013/0036425 A1* | 2/2013 | Zimmermann | G06F 9/4881 |
| | | | 718/106 |
| 2013/0061229 A1* | 3/2013 | Hamada | G06F 9/46 |
| | | | 718/100 |
| 2013/0103977 A1* | 4/2013 | Zimmermann | G06F 11/0751 |
| | | | 714/4.11 |
| 2013/0204926 A1* | 8/2013 | Sakui et al. | 709/203 |
| 2013/0298130 A1* | 11/2013 | Pienaar | G06F 9/4887 |
| | | | 718/102 |
| 2014/0101673 A1* | 4/2014 | Klyuchevskyy | G06F 9/4881 |
| | | | 718/106 |
| 2014/0143519 A1* | 5/2014 | Heidelberger | G06F 12/1027 |
| | | | 711/214 |
| 2014/0189616 A1* | 7/2014 | Rieger et al. | 716/55 |

\* cited by examiner

DYNAMIC CONSTRUCTION AND MANAGEMENT OF TASK PIPELINES

CROSS REFERENCE TO RELATED APPLICATIONS

This application claims priority under 35 U.S.C. § 119(e) to U.S. Provisional Patent Application Ser. No. 61/789,504, filed Mar. 15, 2013 and entitled "Dynamic Construction and Management of Task Pipelines." The content of the U.S. Provisional Patent Application Ser. No. 61/789,504 is incorporated herein in its entirety.

BACKGROUND

Field of Art

The disclosure generally relates to task execution and specifically to the dynamic construction and management of task pipelines.

Description of the Related Art

A server environment performs two types of services, front-end (user facing) services and back-end (non-user facing) services. Back-end services include asynchronous and/or short-lived processing jobs, such as collecting and indexing data from remote systems or processing requests by the user that take longer than a few seconds. Typically, an execution infrastructure within the server environment manages the execution of tasks associated with these back-end services.

The execution infrastructures that exist today have several limitations. These infrastructures do not orchestrate tasks that require the coordination of multiple different types of tasks, do not seamlessly handle retries for failed tasks and do not provide the means to resolve race conditions between different tasks. Further, in some cases, the back-up functionality provided by the execution infrastructure is not robust to system failures.

Accordingly, there is a need for a system that enables the execution of multiple tasks of a pipeline in a robust manner.

BRIEF DESCRIPTION OF DRAWINGS

The disclosed embodiments have advantages and features which will be more readily apparent from the detailed description, the appended claims, and the accompanying figures (or drawings). A brief introduction of the figures is below.

Figure (FIG. 1 illustrates one embodiment of a computing environment configured to aggregate data from several sources and provide the aggregated data to client applications.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed configuration is a system and method for managing the execution of tasks. Each task in a first set of tasks included in a pipeline is queued for parallel execution. The execution of the tasks is monitored by a dispatching engine. When a particular task that specifies a next set of tasks in the pipeline to be executed has completed, the dispatching engine determines whether the next set of tasks can be executed before the remaining tasks in the first set of tasks have completed. When the next set of tasks cannot be executed before the remaining tasks have completed, the next set of tasks is queued for parallel execution (parallel within the set of tasks) only after the remaining tasks have completed.

Example Processing Overview

Figure 1:
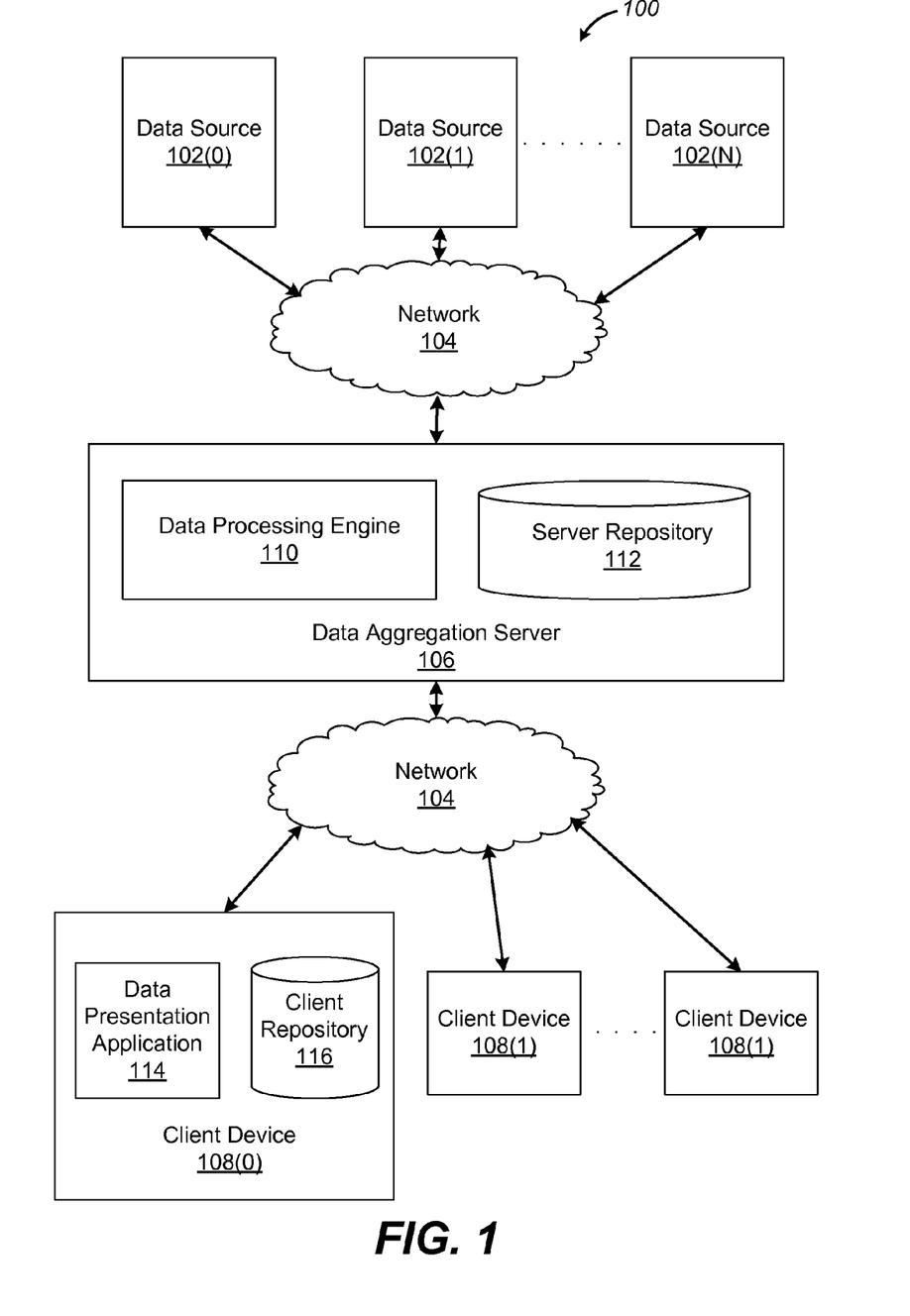

FIG. 1 illustrates one embodiment of a computing environment 100 configured to aggregate data from several sources and provide the aggregated data to client applications. As shown, the computing environment 100 includes data sources 102, a data aggregation server 106 and a client device 108. The data sources 102, the aggregation server 106 and the client device 108 are communicatively coupled through a network 104. Although only one aggregation server 106 and client device 108 are illustrated, the computing environment 100 may include multiple instances of each entity. Moreover, some of the functions ascribed to the aggregation server 106 may be performed by the client device 108 and vice versa. Other entities may also be coupled to the network 104.

One or more data source 102(0) . . . 102(N) (generally 102) are a part of a system that manages and stores data associated with individuals or groups of individuals. For example, a data source 102 may be a contact management system, a customer relationship management (CRM) system or a human resource (HR) management system. Each data source 102 stores data according to a fixed database schema. For example, data source 102(0) may store a user's contact data according to a schema that stores a record per contact, each record being associated with one or more fixed fields. In one embodiment, data storage schemas across different data sources may vary significantly even when storing the same type of data. Each data source 102 provides a channel for accessing and updating data stored within the data source 102.

The data aggregation server 106 includes a data processing engine 110 and a server repository 112. The data processing engine 110 accesses data stored within the data sources 102 via the channels provided by each data source 102. The data processing engine 110 aggregates related data received from the different data sources 102 and organizes the aggregated data into flexible records. A flexible record is a composite of fields aggregated from a set of related records received from one or more data sources 102. Each field associated with a flexible record includes data received from a particular data source 102 and specifies the particular data source 102 as the source of the data. Flexible records are stored in the storage repository 112. Each flexible record stored in the storage repository 112 is associated with at least one user who accesses data via a client device, such as client device 108, communicating with the data aggregation server 106.

In operation, when a user creates an account with the data aggregation server 106, the user identifies one or more data sources 102 that store data associated with the user. In one embodiment, the aggregation server 106 automatically, without user intervention, identifies the data sources 102 that store data associated with the user based on the user's location, name, organization affiliation, etc. The data processing engine 110 retrieves from each identified data source one or more records storing data associated with the user. The records retrieved from different data sources may store related data but may be structured according to different schemas. The data processing engine 110 aggregates the records and stores the aggregated records as flexible records in the storage repository 112. In one embodiment, multiple users may be associated with the same data in one or more data sources 102. In such an embodiment, the data processing engine 110 does not generate multiple flexible records storing the same data but associates the multiple users with the same flexible record storing the data.

Data stored in the server repository 112 that is associated with a particular user is transmitted to the client device 108 operated by the user for presentation in the data presentation application 114. Data received from the server repository 112 is stored in the client repository 116. The data presentation application 114 retrieves data stored in the client repository 116 and allows users to view and interact with the data as well as modify the data if necessary. Any modifications made to the data are stored in the client repository 116 and also transmitted by the data presentation applications 114 to the data processing engine 110.

The data processing engine 110 tracks all modifications made via the data presentation application 114 to data that is also stored in the server repository 112. In one embodiment, the data processing engine 110 identifies a particular data field stored in the server repository 112 that was modified via the data presentation application 114. The data processing engine 110 transmits the modified data to the data source 102 specified in the data field. In such a manner, a data field that is modified on the client device 108 may be synchronized with the data field stored in the server repository 112 as well as the data source 102 from which the data associated with the data field was originally retrieved.

The network 104 represents the communication pathways between the bookshelf server 104, client device 112, and any other entities on the network. In one embodiment, the network 104 is the Internet and uses standard communications technologies and/or protocols. Thus, the network 104 can include links using technologies such as Ethernet, 802.11, worldwide interoperability for microwave access (WiMAX), 3G, long term evolution (LTE), digital subscriber line (DSL), asynchronous transfer mode (ATM), InfiniBand, PCI Express Advanced Switching, etc. Similarly, the networking protocols used on the network 104 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 104 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In other embodiments, the entities use custom and/or dedicated data communications technologies instead of, or in addition to, the ones described above.

Figure 2:
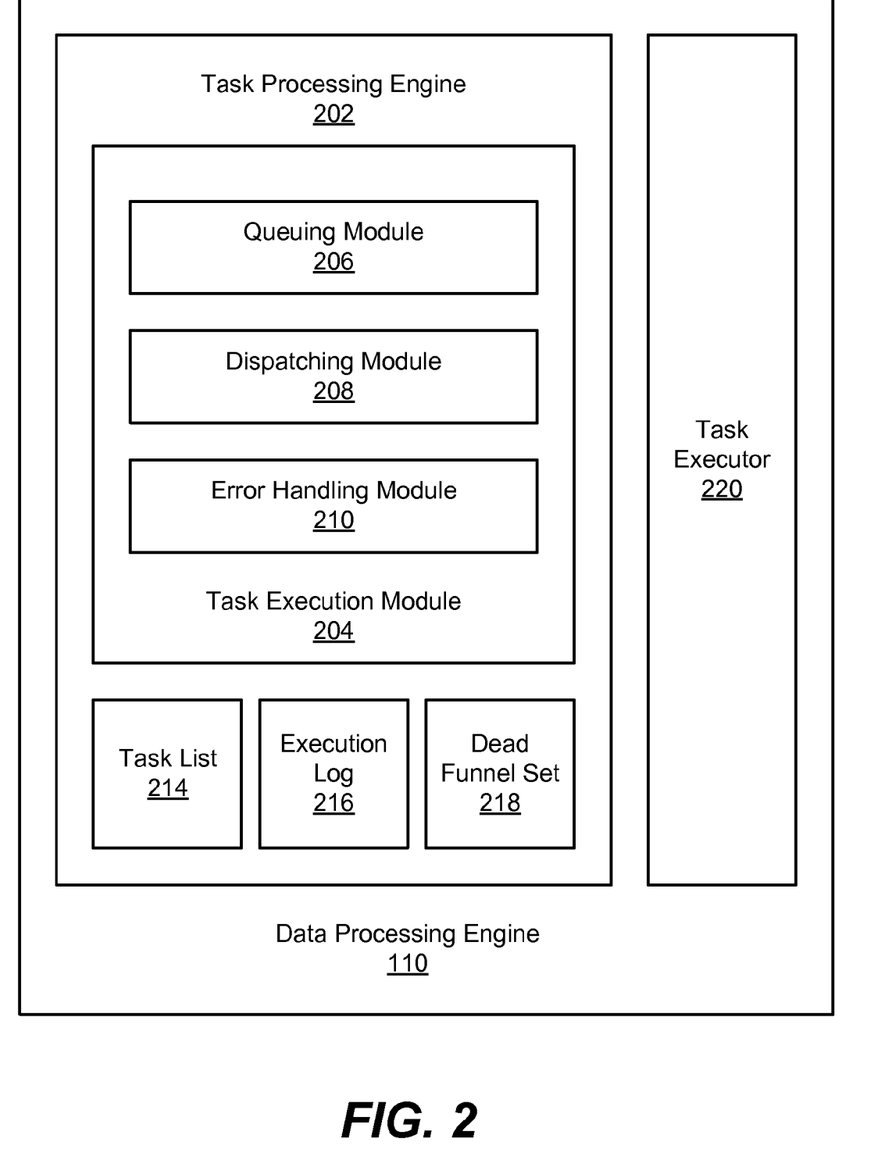
FIG. 2 illustrates an embodiment of the data processing engine of FIG. 1.

FIG. 2 illustrates an embodiment of the data processing engine 110 of FIG. 1. As shown, the data processing engine 110 includes a task processing engine 202 and a task executor 220. The task processing engine 202 orchestrates the execution of various tasks performed by the data processing engine 110. Such tasks include, but are not limited to, data aggregation tasks related to data retrieved from the data sources 102 or data access tasks for accessing data in the server repository 112. The task executor 220 executes commands specified by different tasks within one or more processors.

The task processing engine 202 includes a task execution module 204, a task list 214, an execution log 216 and a dead funnel set 218. The task execution module 204 queues and monitors the execution of tasks performed by the data processing engine 110. In one embodiment, the task execution module 204 executes as a hypertext transfer protocol (HTTP) server that receives tasks for queuing via HTTP post commands. Modules that send tasks to the task execution module 204 may also retrieve the execution status of particular tasks via HTTP get commands. The task execution module 204 receives task organized as funnels. A funnel includes one or more tasks, and multiple tasks in a given funnel can be executed in parallel. Further, a funnel may include a nested funnel such that tasks included in the funnel are further divided into multiple stages. Two or more funnels may also be sequentially linked to create a pipeline of funnels. For tasks in a pipeline, tasks in a subsequent funnel can be executed only once the tasks in the previous funnel are complete. The tasks in a pipeline do not have to be defined or specified at the time the task execution module 204 receives the pipeline or a portion thereof. The tasks in the pipeline may be dynamically added as other tasks in the pipeline are executed.

The task execution module 204 includes a queuing module 206, a dispatching module 208 and an error handling module 210. The queuing module 206 receives funnels of tasks for execution from various modules in the data processing engine 110. The queuing module 206 queues each task of the received funnel in the task list 214. Each task specifies a uniquely identifiable key and a command. In one embodiment, a key is a combination of a unique job identifier and the type of task, e.g., an archive type or an index job type. The command identifies the particular code to be executed to complete the task as well as any inputs needed to execute the code. In one embodiment, each task and/or each funnel of tasks is associated with a given user or a processing track. The funnel may be associated with an identifier that maps to a single user. In alternate embodiments, the identifier associated with the funnel may be more coarse or fine grained than being mapped to a single user. For example, the identifier may be a source identifier identifying a particular source associated with the user.

The dispatching module 208 dispatches tasks queued in the task list 214 for execution in the task executor 220. Tasks belonging to the same funnel can be dispatched for execution in parallel. A given task may be dispatched for execution only when all the tasks in a funnel associated with a previous stage of the pipeline have completed. To accomplish this ordering of task execution, the dispatching module 208 tracks, for each task in the task list 214, other tasks in a pipeline that must complete execution before that task can be dispatched for execution. When a particular task completes execution, the dispatching module 208 receives an indication of the completed execution. The indications may optionally specify a next task to be executed once the task completes execution. The queuing module 206 queues the next task for execution. Because a task in a pipeline may specify a next task at completion, the pipeline does not have a pre-determined structure and tasks can be dynamically included in the pipeline during execution, i.e., at run-time.

In one embodiment, a funnel in a pipeline may be marked as a "serial" funnel. When a task in a serial funnel completes execution, the dispatching module 208 analyzes the task list 214 to identify any tasks already queued that match the uniquely identifiable key of the completed task. If such tasks exist, the dispatching module 208 dispatches those tasks for execution before tasks included in subsequent funnels of the pipeline.

The task processing engine 202 also maintains the execution log 216. The execution log 216 periodically captures state information related to the execution of currently dispatched tasks. The information captured by the execution log 216 includes the identity of tasks that have timed out, tasks that have experienced an error during execution and tasks that have successfully completed, etc. The error handling module 210 analyzes the execution log 216 at regular intervals to determine whether a task needs to be re-queued for execution, for example, when the task has timed out or has experienced an error. In one embodiment, the error handling module 210 re-queues a given task only a pre-determined number of times before retiring the entire funnel including the fatal task to the dead funnel set 218.

In one embodiment, the task processing engine 202 periodically saves processing states of each of the currently executing tasks in the server repository 112. Consequently, if the task processing engine 202 or the data aggregation server 106, as a whole, suffers a failure, the task processing engine 202 is able to resurrect processing state from the server repository 112 and continue to execute dispatched tasks.

Figure 3:
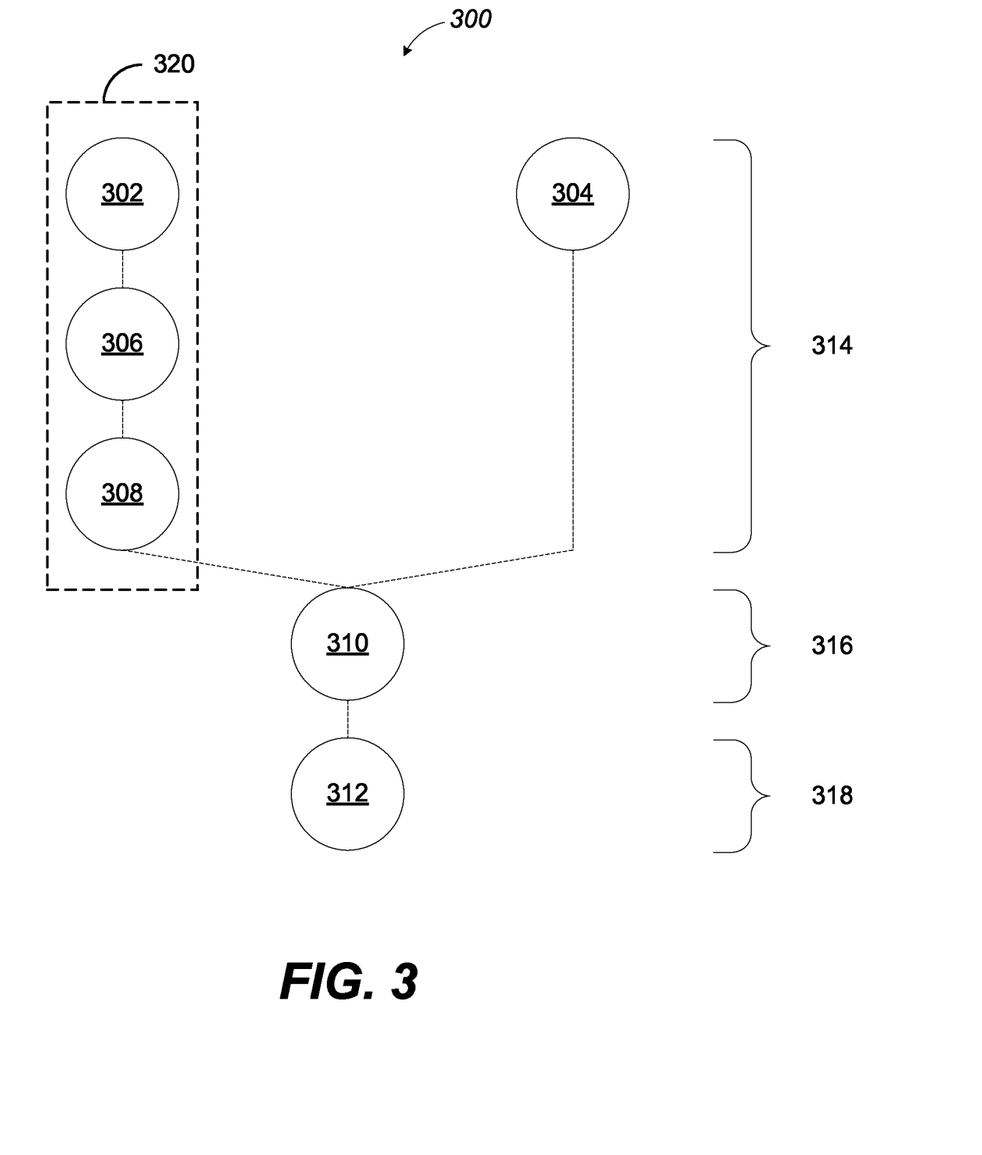
FIG. 3 illustrates an embodiment of a pipeline executed by the data processing engine of FIG. 1.

FIG. 3 illustrates an embodiment of a pipeline 300 executed by the data processing engine 110 of FIG. 1. As shown, the pipeline 300 includes three funnels, funnel 314, funnel 316 and funnel 318. Funnel 314 includes task 304 and a nested funnel 320 that includes task 302, 304 and 306. Funnel 316 includes task 310 and funnel 318 includes task 312.

When tasks included in funnels 314, 316 and 318 are queued in the task list 214, the dispatching module 208 dispatches the tasks in funnel 314 before dispatching tasks in funnel 316 and 318. Within funnel 314, the dispatching module 208 dispatches tasks 302 and 304 in parallel, but dispatches task 306 only when task 304 completes and task 308 only when task 306 completes. When task 308 and task 304 complete, the dispatching module 208 dispatches task 310. Finally, when task 310 completes, the dispatching module 208 dispatches task 312.

Figure 4A:
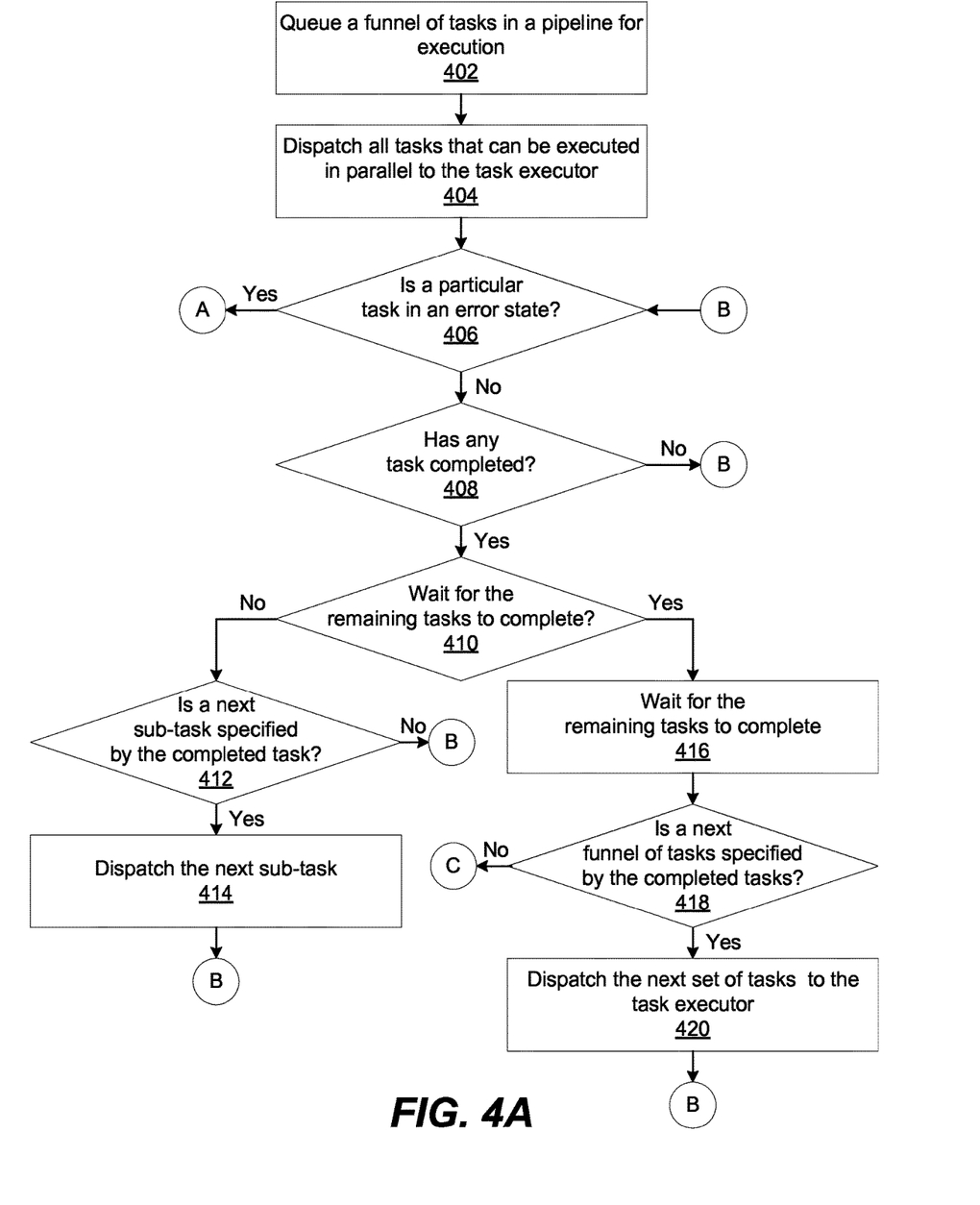
FIGS. 4A and 4B illustrate an embodiment of a process for managing the execution of a pipeline of tasks.
Figure 4B:
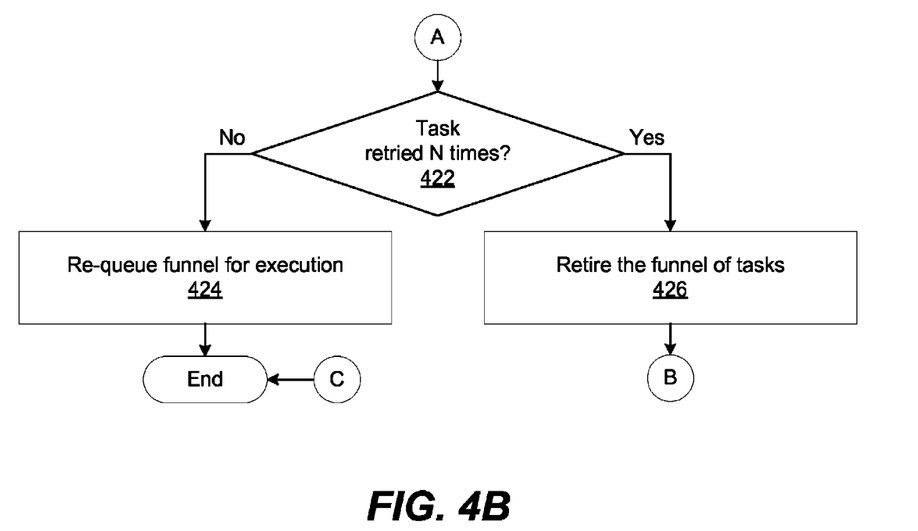

FIGS. 4A and 4B illustrate an embodiment of a process for managing the execution of a pipeline of tasks. At step 402, the queuing module 206 queues in the task list 214 each task in a funnel included in a pipeline. At step 404, the dispatching module 208 dispatches all the tasks included in the funnel that are not gated by the execution of previous tasks from the task list 214 to the task executor 220. At step 406, the error handling module 210 analyzes the execution log 216 to determine whether any of the dispatched tasks are in an error state.

If none of the dispatched tasks is in an error state, then the method proceeds from step 406 to step 408. At step 408, the dispatching module 208 determines whether any of the dispatched tasks have completed. Specifically, when a particular task completes execution, the dispatching module 208 receives an indication of the completed execution. At step 410, the dispatching module 208 determines whether execution of the pipeline can advance to a subsequent task or a subsequent funnel in the pipeline or whether to wait on the remaining dispatched tasks.

If the dispatching module 208 determines that the execution can advance, the method proceeds from step 410 to step 412. At step 412, the dispatching module 208 analyzes the indication received when the task completed execution to determine whether a next sub-task to be executed was specified. If not, the method returns to step 406. If a next sub-task is specified, however, the method proceeds to step 414, where the dispatching module 208 dispatches the next sub-task to the task executor for execution. The method then returns to step 406.

If, step 410, the dispatching module 208 determines that the execution cannot advance, the method proceeds from step 410 to step 416. At step 416, the dispatching module 208 waits for the remaining tasks to complete before advancing the execution of the pipeline. At step 418, the dispatching module 208 analyzes the indications received when the tasks complete execution to determine whether a next funnel of tasks to be executed was specified by each of the completed tasks. If so, the dispatching module 208 dispatches the next sub-task to the task executor for execution. The method then returns to step 406. If, however, a next funnel of tasks was not specified, the method ends.

Referring back to step 406, if at least one of the dispatched tasks is in an error state, the method proceeds from step 406 to step 422. At step 422, the error handling module 210 determines whether the number of times the task in the error state has been retried equals a pre-determined threshold. If so, at step 426 the error handling module 210 retires the funnel to the dead funnel set 218. If, however, the task has not been retried a pre-determined number of times, at step 424 the error handling module 210 re-queues the task for future dispatch and execution.

Computing Machine Architecture

Figure 5:
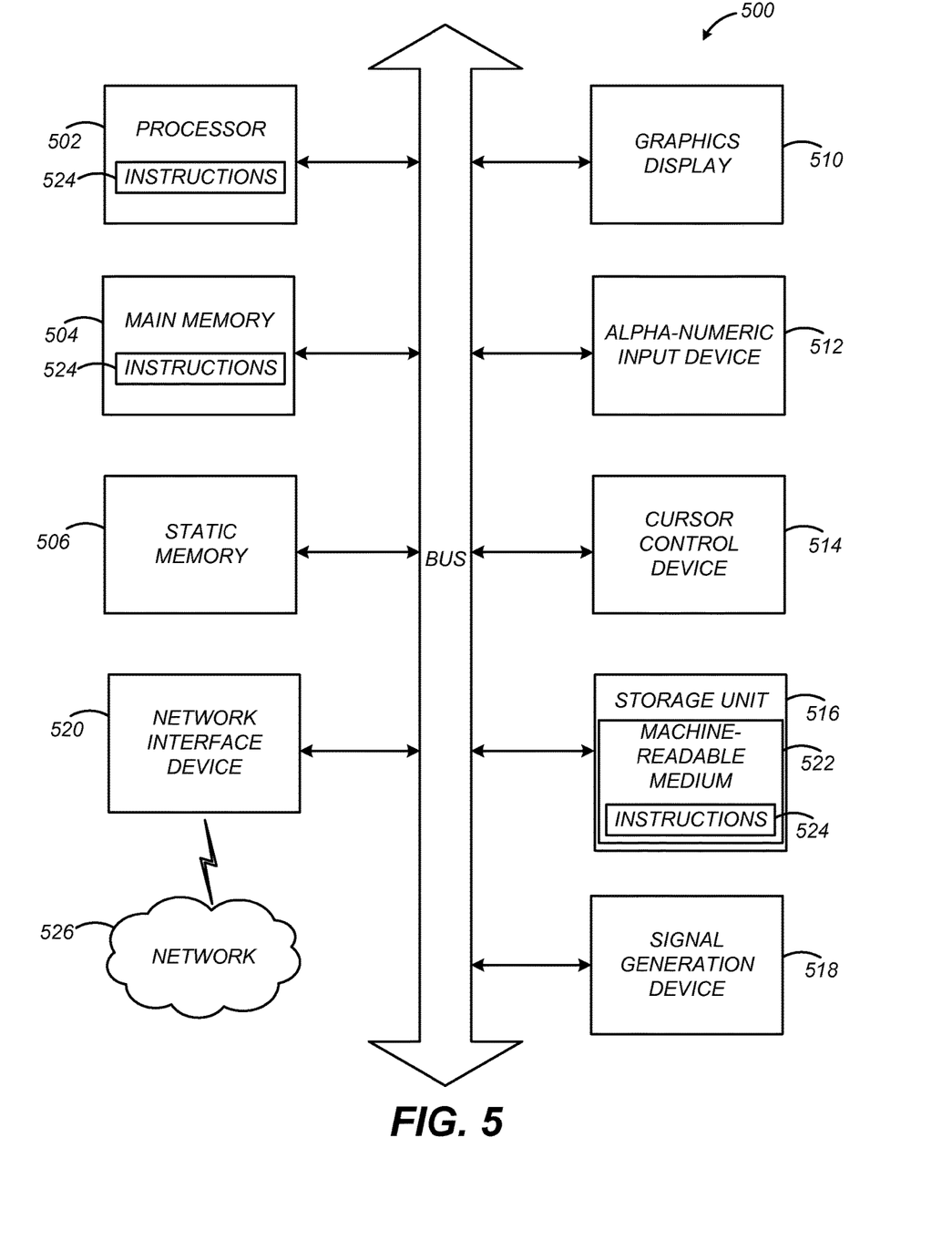
FIG. 5 illustrates one embodiment of components of an example machine able to read instructions from a machine-readable medium and execute them in a processor (or controller).

The disclosed software structures and processes described with FIGS. 1-4B are configured for operation on a machine, e.g., a computing system. FIG. 5 is a block diagram illustrating components of an example machine able to read instructions from a machine-readable medium and execute them in one or more processors (or controllers). Specifically, FIG. 5 shows a diagrammatic representation of a machine in the example form of a computer system 500 within which instructions 524 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine for this configuration may be a computing server or a computing server architecture. In addition, devices such as a mobile computing device may apply. For example, a a tablet computer, an ultrabook (or netbook) computer, a personal digital assistant (PDA), a cellular telephone, a smartphone, a web appliance, or like machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processors (generally, processor 502) (e.g., a central processing unit (CPU) and may also include a graphics processing unit (GPU), a digital signal processor (DSP), one or more application specific integrated circuits (ASICs), one or more radio-frequency integrated circuits (or chipset) (RFICs), a wireless fidelity (WiFi) chipset, a global positioning system (GPS) chipset, an accelerometer (one, two, or three-dimensional), or any combination of these). The computer system 500 also includes one or more memories such as a main memory 504 and a static memory 506. The components of the computing system are configured to communicate with each other via a bus 508. The computer system 500 may further include graphics display unit 510 (e.g., a plasma display panel (PDP), a liquid crystal display (LCD)) which may be configured for capacitive or inductive touch sensitivity to allow for direct interaction with software user interfaces through the display 510. The computer system 500 may also include alphanumeric input device 512 (e.g., a keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software or computer program product) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

An advantage of the configurations as disclosed is that a fault-tolerant pipeline of tasks can be generated dynamically during runtime. Further, dependencies between tasks are tracked such that certain tasks are dispatched for execution only when any tasks that must be executed before those tasks are complete.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-3. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 502, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules. For example, the processor described in FIGS. 4A-4B may be embodied as software.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for managing the execution of tasks through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for managing the execution of tasks, the method comprising:

receiving from a module executing in a computer system a first command for queuing a first funnel comprising a first plurality of tasks, the first command specifying that the first funnel is serialized, the first funnel divided into a first sub-stage comprising the first task and a second task in the first plurality of tasks and a second sub-stage comprising a third task in the first plurality of tasks, the third task being dependent on the first task and independent from the second task;

queuing, responsive to the first command, each task in the first plurality of tasks for execution in parallel, wherein the queuing each task in the first plurality of tasks comprises:

queuing the first task and the second task for parallel execution on different threads, and queuing the third task for execution upon completion of the execution of the first task without waiting for the completion of the execution of the second task;

dispatching, without user intervention, the first plurality of tasks for execution within a task executor that executes the first plurality of tasks;

receiving from the module a third funnel comprising a third plurality of tasks having a same type as the first plurality of tasks:

queuing the third plurality of tasks for execution before queuing the second plurality of tasks for execution;

receiving from the module a plurality of completion commands for completing execution of the first plurality of tasks, each of the plurality of completion commands identifying a different corresponding tasking in the first plurality of tasks and identifying a second funnel comprising a second plurality of tasks for execution;

responsive to receiving the completion commands, queuing the second plurality of tasks for execution;

dispatching, without user intervention and upon receiving one or more indications from the task executor specifying that each of the first plurality of tasks has completed execution, the second plurality of tasks for execution within the task executor;

determining after a configurable time period of queuing the second plurality of tasks that the execution of a fourth task of the first plurality of tasks has not completed; and re-queuing the fourth task for execution.

2. The method of claim 1, wherein the first command specifies a unique key and a task type associated with each of the first plurality of tasks.

3. The method of claim 2, wherein a first completion command of the plurality of completion commands corresponding to a fifth task of the plurality of tasks specifies the unique key and the task type associated with the fifth task.

4. The method of claim 1, wherein the first command is a hypertext transfer protocol command, and wherein the first plurality of tasks are specified in a data structure identified by the first command.

5. The method of claim 1, further comprising:
receiving a fourth plurality of tasks associated with the first funnel; and
queuing the fourth plurality of tasks for execution upon completion of the execution of each of the first plurality of tasks and before queuing the second plurality of tasks for execution.

6. The method of claim 1, further comprising:
determining that after a configurable time period of the re-queuing the execution of the fourth task has not completed;
stopping the execution of the first plurality of tasks.

7. The method of claim 1, further comprising periodically storing an execution state of each of the tasks in the first plurality of tasks and the second plurality of tasks in a database.

8. A non-transitory computer readable medium storing instructions that, when executed by a processor, causes the processor to manage the execution of tasks, the instructions when executed cause the processor to:
receive from a module executing in a computer system a first command for queuing a first funnel comprising a first plurality of tasks, the first command specifying that the first funnel is serialized, the first funnel divided into a first sub-stage comprising the first task and a second task in the first plurality of tasks and a second sub-stage comprising a third task in the first plurality of tasks, the third task being dependent on the first task and independent from the second task;
responsive to the first command, queue each task in the first plurality of tasks for execution in parallel, wherein the queuing each task in the first plurality of tasks comprises:
queuing the first task and the second task for parallel execution on different threads, and
queuing the third task for execution upon completion of the execution of the first task without waiting for the completion of the execution of the second task;
dispatch, without user intervention, the first plurality of tasks for execution within a task executor that executes the first plurality of tasks;
receive from the module a third funnel comprising a third plurality of tasks having a same type as the first plurality of tasks:
queue the third plurality of tasks for execution before queuing the second plurality of tasks for execution;
receive from the module a plurality of completion commands for completing execution of the first plurality of tasks, each of the plurality of completion commands identifying a different corresponding tasking in the first plurality of tasks and identifying a second funnel comprising a second plurality of tasks for execution;
responsive to receiving the completion commands, queue the second plurality of tasks for execution;
dispatch, without user intervention and upon receiving one or more indications from the task executor specifying that each of the first plurality of tasks has completed execution, the second plurality of tasks for execution within the task executor
determine after a configurable time period of queuing the second plurality of tasks that the execution of a fourth task of the first plurality of tasks has not completed; and
re-queue the fourth task for execution.

9. The non-transitory computer readable medium of claim 8, wherein the first command specifies a unique key and a task type associated with each of the first plurality of tasks.

10. The non-transitory computer readable medium of claim 9 wherein a first completion command of the plurality of completion commands corresponding to a first task of the plurality of tasks specifies the unique key and the task type associated with the first task.

11. The non-transitory computer readable medium of claim 8, wherein the first command is a hypertext transfer protocol command, and wherein the first plurality of tasks are specified in a data structure identified by the first command.

12. The non-transitory computer readable medium of claim 8, wherein the instructions when executed further cause the processor to:
receive a fourth plurality of tasks associated with the first funnel; and
queue the fourth plurality of tasks for execution upon completion of the execution of each of the first plurality of tasks and before queuing the second plurality of tasks for execution.

13. The non-transitory computer readable medium of claim 8, wherein the instructions when executed further cause the processor to:
determine that after a configurable time period of the re-queuing the execution of the fourth task has not completed;
stop the execution of the first plurality of tasks.

14. A computer system, comprising:
a processor; and
a non-transitory, computer-readable medium comprising instructions for a task execution module executing on a hypertext transfer protocol (HTTP) server, the task execution module configured to:
receive from a module executing in a computer system a first command for queuing a first funnel comprising a first plurality of tasks, the first command specifying that the first funnel is serialized, the first funnel divided into a first sub-stage comprising the first task and a second task in the first plurality of tasks and a second sub-stage comprising a third task in the first plurality of tasks, the third task being dependent on the first task and independent from the second task;
responsive to the first command, queue each task in the first plurality of tasks for execution in parallel, wherein the queuing each task in the first plurality of tasks comprises:
queuing the first task and the second task for parallel execution on different threads, and
queuing the third task for execution upon completion of the execution of the first task without waiting for the completion of the execution of the second task;

dispatch, without user intervention, the first plurality of tasks for execution within a task executor that executes the first plurality of tasks;

receive from the module a third funnel comprising a third plurality of tasks having a same type as the first plurality of tasks;

queue the third plurality of tasks for execution before queuing the second plurality of tasks for execution;

receive from the module a plurality of completion commands for completing execution of the first plurality of tasks, each of the plurality of completion commands identifying a different corresponding tasking in the first plurality of tasks and identifying a second funnel comprising a second plurality of tasks for execution;

responsive to receiving the completion commands, queue the second plurality of tasks for execution;

dispatch, without user intervention and upon receiving one or more indications from the task executor specifying that each of the first plurality of tasks has completed execution, the second plurality of tasks for execution within the task executor determine after a configurable time period of queuing the second plurality of tasks that the execution of a fourth task of the first plurality of tasks has not completed; and re-queue the fourth task for execution.

15. The computer system of claim 14, wherein the first command specifies a unique key and a task type associated with each of the first plurality of tasks.

16. The computer system of claim 15, wherein a first completion command of the plurality of completion commands corresponding to a first task of the plurality of tasks specifies the unique key and the task type associated with the first task.

17. The computer system of claim 14, wherein the first command is a hypertext transfer protocol command, and wherein the first plurality of tasks are specified in a data structure identified by the first command.

18. The computer system of claim 14, wherein the instructions when executed further cause the processor to:
receive a fourth plurality of tasks associated with the first funnel; and
queue the fourth plurality of tasks for execution upon completion of the execution of each of the first plurality of tasks and before queuing the second plurality of tasks for execution.

19. The computer system of claim 14, wherein the instructions when executed further cause the processor to:
determine that after a configurable time period of the re-queuing the execution of the fourth task has not completed;
stop the execution of the first plurality of tasks.

* * * * *

UNITED STATES PATENT AND TRADEMARK OFFICE
CERTIFICATE OF CORRECTION

PATENT NO. : 9,952,898 B2  
APPLICATION NO. : 14/209900  
DATED : April 24, 2018  
INVENTOR(S) : Dhananjay Prasanna Page 1 of 1

It is certified that error appears in the above-identified patent and that said Letters Patent is hereby corrected as shown below:

In the Claims

Column no: 11, Line(s): 28-29, Claim 6: "completed; stopping" to read as -- completed; and stopping --

Column no: 11, Line(s): 61, Claim 8: "plurality of tasks:" to read as -- plurality of tasks; --

Column no: 12, Line(s): 9, Claim 8: "executor" to read as -- executor; --

Column no: 12, Line(s): 18, Claim 10: "claim 9" to read as -- claim 9, --

Column no: 12, Line(s): 41, Claim 13: "completed;" to read as -- completed; and --

Column no: 14, Line(s): 25, Claim 19: "completed;" to read as -- completed; and --

Signed and Sealed this  
Twenty-third Day of April, 2019

Andrei Iancu  
*Director of the United States Patent and Trademark Office*